Aug. 13, 1946.  J. N. SWARR  2,405,801
TELEMETRIC APPARATUS
Filed Sept. 1, 1943  2 Sheets-Sheet 1

INVENTOR
Jay N. Swarr
BY E. C. Sanborn
ATTORNEY

Aug. 13, 1946.                J. N. SWARR                2,405,801
                        TELEMETRIC APPARATUS
                        Filed Sept. 1, 1943            2 Sheets-Sheet 2
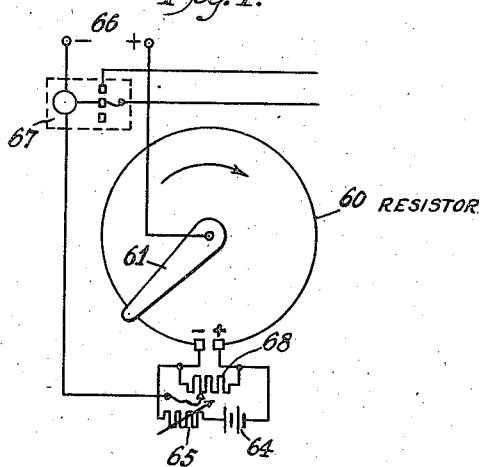
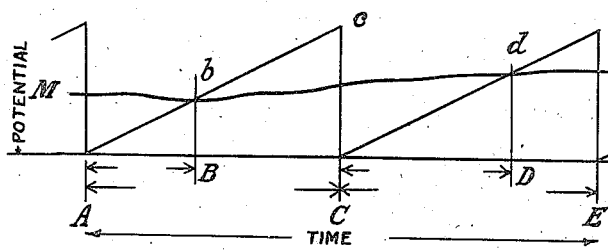
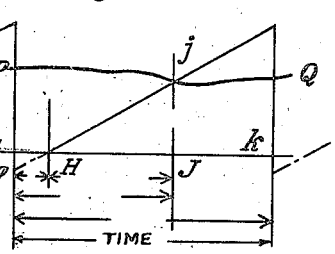
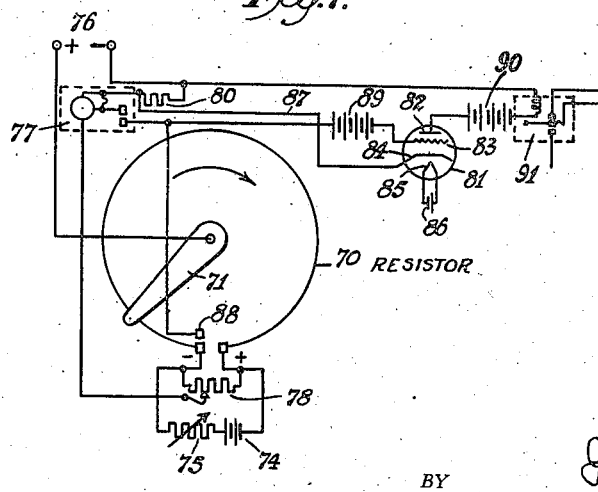

Patented Aug. 13, 1946

2,405,801

UNITED STATES PATENT OFFICE 2,405,801

TELEMETRIC APPARATUS

Jay N. Swarr, Woodbury, Conn., assignor to The Bristol Company, Waterbury, Conn., a corporation of Connecticut Application September 1, 1943, Serial No. 500,776

8 Claims. (Cl. 171—95)

This invention relates to telemetering apparatus of the impulse-duration class, and especially to a transmitter in which there are produced a series of cyclical impulses of successive durations proportional to the values of relatively low electrical potentials derived from variable sources. In the impulse-duration system of telemetering it is the practice to cause a transmitting instrument to develop a series of impulses occurring cyclically and of durations varying with the magnitude of a measured quantity, and to impress these impulses upon a receiving instrument which is adapted to produce an indication or a record whose magnitudes corresponding to successive time intervals shall be governed by the relative intervals of energization and de-energization in each of the cycles determined by the transmitting instrument. A transmitting instrument adapted to use in telemetering systems of this class is fully described and set forth in U. S. Letters Patent No. 2,214,159, issued F. B. Bristol, September 10, 1940; and a receiving instrument adapted to use in such a system is described in U. S. Letters Patent No. 2,040,918, issued to C. W. Bristol, May 19, 1936.

In a telemetering system using a transmitter of the class having a deflecting pointer, as set forth in said F. B. Bristol patent, the speed with which successive impulses may be developed is of necessity restricted by mechanical limitations of the device, said limitations including the necessity for causing said pointer to assume in each cycle of operation a position corresponding to the magnitude of the measured quantity. Furthermore, in instruments where the measured quantity is represented by D.-C. millivolts, as where a measurement is being made upon the output of a thermocouple, a shunt, or a thermal converter, the amount of power available for positioning the pointer is of relatively small magnitude, frequently necessitating that some form of servomotor be interposed between the measured magnitude and the deflected index or pointer by whose position the transmitted impulses are defined. While such a system of measurement is capable of great precision, it is obviously subject to a certain degree of time delay, and also requires the use of mechanical devices which are at the same time relatively intricate and expensive.

It is an object of the present invention to provide a transmitter adapted to develop a series of recurrent cyclical impulses of durations directly representative of the successive values of a D.-C. potential applied to a measuring circuit.

It is a further object to provide means of accomplishing the above purpose without the interposition of any means deflecting to a position representative of the value of said potential.

It is a further object to provide a device of the above nature capable of operation at a relatively high speed, so that the impulses developed thereby may follow one another in a more rapid succession than where a deflecting index or pointer is involved.

It is a further object to provide a device of the above nature in which the desired results shall be effected through the employment of a relatively simple and inexpensive mechanism, having a minimum number of moving parts.

In carrying out the purposes of the invention, it is proposed to provide a continuously operating potentiometer device adapted to perform a measurement on a D.-C. potential and having a circuit-controlling galvanometer or equivalent member adapted to affect an electrical circuit in one sense when the potentiometer voltage is less than the measured potential, and to affect said circuit in another sense when the potentiometer voltage is greater than said measured potential, to produce in said circuit a signal of a duration commensurate with said potential.

In the drawings:

Figs. 3 and 4 are diagrams showing means for providing certain refinements sometimes desirable in operation of the invention.

Figs. 5 and 6 are graphic representations of certain magnitudes characterizing operation of the invention.

Fig. 7 is a diagram of an alternative form of the invention.

Figure 1:
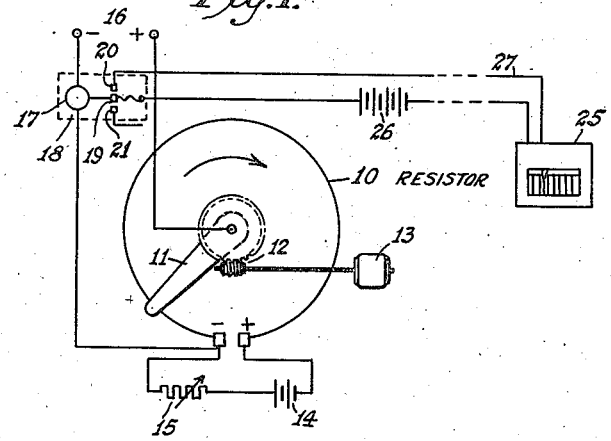
Fig. 1 is a diagrammatic representation of a telemetering system utilizing an impulse transmitter embodying the principles of the invention.

Referring now to Fig. 1 of the drawings: The numeral 10 designates a slide-wire of uniform resistance and of circular conformation, having its ends in close mutual proximity, and adapted to be traversed by a contact arm 11 driven at a constant speed through a gearing 12 from a continuously operating motor 13, whereby a continuous and cyclical "scanning" of the slide wire by said contact arm is effected. To the terminals of the slide-wire 10 is connected a battery 14 having in series therewith an adjustable rheostat 15 whereby current in said slide-wire may be maintained at a pre-determined value, the left-hand terminal of the slide wire being given negative polarity. It will be seen that as the contact arm 11 traverses the slide-wire 10 the potential of said arm with respect to either end of the slide-wire will vary between zero and a maximum value at a uniform rate with respect to time, and that as the contact arm 11 passes quickly from one to the other of the slide-wire terminals, said potential will change substantially instantaneously from one extreme to the other of its series of values. A potential varied in this manner is commonly known as a "saw tooth voltage."

Assuming that the contact arm 11 be given a clockwise rotation as shown in the drawings, and that the polarity of the battery 14 be so selected that the left hand terminal of the slide-wire 10 is of negative polarity, the potential between the contact arm 11 and said terminal will gradually rise to a maximum value, and then, as the arm passes from the right hand to the left hand terminal, will suddenly drop from the maximum to a zero value.

A source of D.-C. E. M. F. 16, not exceeding the maximum potential to be derived from the slide-wire 10, and whose value is to form the basis of measurement performed by the device, is connected with the positive side of its circuit to the contact arm 11, and its negative side to the left hand terminal of the slide wire 10 in series with the movable coil 17 of a galvanometer 18. To the movable coil 17 is attached a contact 19 normally floating between two stationary contacts 20 and 21, and adapted to engage one or other of said contacts according to whether the potential derived by the sliding contact 11 from the slide-wire 10 is greater or less than that existing at the source 16. It will be seen that, as the contact arm 11 in its excursion from one end to the other of the slide-wire passes that point at which the slide-wire potential is equal to that existing at the source 16, the moving element 17 of the galvanometer 18 will be abruptly deflected in a manner to cause the contact 19 suddenly to be transferred from one to the other of the contacts 20 and 21. It will furthermore be apparent that, as the contact arm 11 passes from the right end to the left end of the slide-wire 10 the action of the galvanometer 18 will be abruptly reversed, and the contact 19 returned to its original position. Since the arm 11 is being rotated at a constant velocity, and since the contact change in the galvanometer takes place as said arm passes a point on the slide-wire corresponding to the then value of E. M. F. at the source 16, and since the galvanometer contacts are returned to their original setting always at the same point in the cycle of operation of the arm 12, it is obvious that the duration of engagement between the contact 19 and the respective contact members engaged thereby will in each cycle be a measure of the magnitude of the E. M. F. existing at the source 16. There has thus been provided means whereby an electrical circuit may be controlled to produce successive cyclical impulses of durations corresponding to values of a D.-C. potential to be measured.

A receiving instrument 25, which may be of the type set forth and described in the hereinbefore mentioned C. W. Bristol patent, adapted to provide a quantitative measure based upon the durations of electrical impulses to an electromagnet therein, is connected in series with the contacts 19 and 20 to a battery 26 through an interconnecting line 27, whereby the operation of said instrument may be made subject to the impulses developed at said contacts. There is thus provided a complete telemetering system in which the value of E. M. F. as measured at a point is indicated or recorded by an instrument which may be located at a point remote therefrom.

The connection and arrangements of the elements of the instrument 25 with respect to the contacts in the galvanometer 18, as to whether a closed or an opened condition of said contacts causes the pointer or recording pen in said instrument to advance from the zero of the scale, is a matter of choice, and may be governed by conditions characterizing the individual installation, without in any way effecting the relation of the device to the operation of the invention. The same latitude of choice exists in the matter of whether the operation of the galvanometer 18 be made subject to a rising or a falling slide-wire potential.

Figure 2:
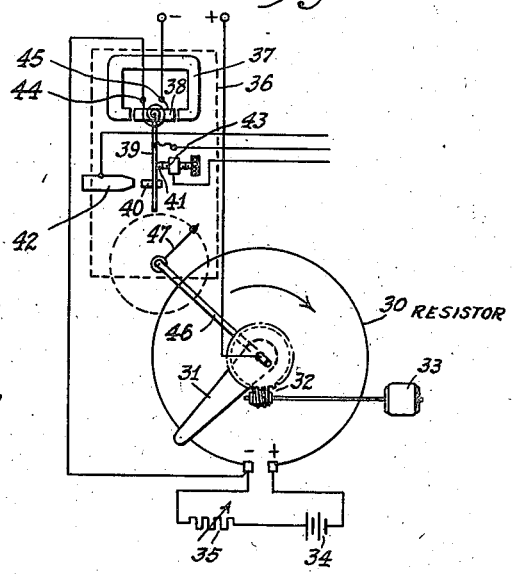
Fig. 2 is a diagram showing an alternative form of one of the elements suited to the purposes of the invention.

To obtain advantageously precise operation of the galvanometer element in the telemetering system, asid element should be rapid in its action, so that the time elapsed between the instant when the contact arm 11 reaches the critical voltage point on the slide-wire 10 and the instant when the galvanometer acts to modify its contact arrangement shall be negligible as compared with the normal time of rotation of said contact arm. This characteristic of high speed operation of the galvanometer need, however, be present only at one end of the impulse determined thereby, for, as the contact arm 11 passes the point of abrupt change in voltage, that change is so rapid that high sensitivity on the part of the galvanometer is not necessary. One way in which such high speed action may be attained is to utilize a relay having high sensitivity and rapid response in one direction and which is subject to resetting in the opposite sense by "artificial" or extraneous methods. Such a relay is found in the type marketed under the trade name of "Sensitrol," one form of which is disclosed in U. S. Letters Patent 2,014,385 issued to A. H. Lamb, September 17, 1935. An application of a relay of this general type to the purposes of the invention is shown in Fig. 2. A slide-wire 30 traversed by a contact arm 31 driven through gearing 32 from a constant speed motor 33, and energized by a battery 34 through an adjustable rheostat 35, forms an equivalent to the corresponding elements shown in Fig. 1.

A relay 36 is comprised of a bipolar permanent magnet 37 having pivoted for limited deflection in the field thereof a movable coil 38 carrying an arm or pointer 39 to which are attached electrical contacts 40 and 41. The contact 40 is formed of magnetic material and is adapted upon deflection of the movable element 38 in a clockwise direction as shown in the drawings to engage a stationary contact 42 in the form of a permanent magnet. The contact 41, also carried by the arm 39, is adapted to engage an adjustable contact 43 which also serves as a definite stop to the deflection of the moving element when the latter is deflected in a direction to bring said last-named contacts into engagement. The moving element 38 is provided with leading-in springs 44 and 45 which are adjusted normally to maintain the contact 41 in engagement with the contact 43, the latter contact being adjusted to prevent the element 38 from moving beyond a position where the attraction of the magnet 42 for the contact 40 as opposed to the torque of said springs places the element 38 in a condition of unstable equilibrium. Thereby, an infinitesimal current flow in a sense tending to deflect the contact 40 toward the magnet 42 will overcome the balance and will allow the magnet 42 to pull the contact 40 substantially instantaneously into engagement therewith.

Mechanically attached to the contact arm 31, as by a shaft 46, is an extended arm 47 adapted to engage the pointer 39 at the same instant as the contact arm 31 passes from the right hand to the left hand end of the slide wire, and forcibly separate the contacts 40—42, swinging the arm 39 to such a position that contacts 41—43 are brought into engagement. The leading-in springs 44—45, representing the terminals of the movable coil 38, being connected to the left hand end of the slide wire 30 and to one side of a source of E. M. F. to be measured, and the other side of said source being connected to the contact arm 31, there is provided means whereby the contacts carried by the arm 39 in cooperation with one or both of the stationary contacts 42 and 43 may be utilized to develop telemetering impulses of durations representative of the values assumed by the E. M. F. at the source 46.

In certain forms of receiving instruments for telemetering systems of the impulse duration class, it is desirable to allow a short time interval or "dwell" between successive cycles of operation. This enables the elements of the receiving apparatus to reset themselves to their respective starting points at the termination of each cycle; and, in order that there be no errors due to rebounding of the parts, this time interval should have an appreciable value. This does not introduce any error into the measurements transmitted by the telemetering system, but requires that for a short portion of each cycle the function of measurement be suspended. This result may be effected in a transmitter embodying the principles of the present invention in any one of a number of ways, two of which are illustrated in Figs. 3 and 4 respectively.

Figure 3:
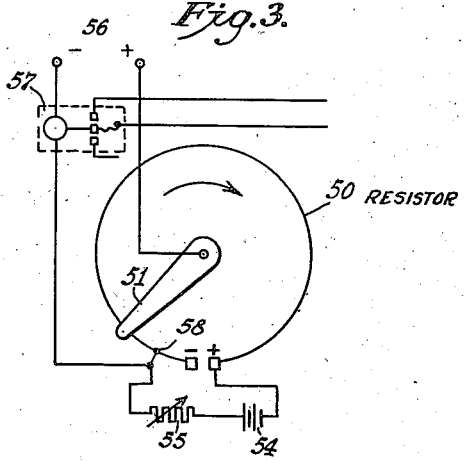

In Fig. 3 a slide-wire 50 traversed by continuously rotating contact arm 51 and energized from a battery 54 through an adjustable rheostat 55 provides a means of determining the value of an E. M. F. 56 and expressing the same in the form of impulses developed by a galvanometer type relay 57 connected in circuit as in the hereinbefore described embodiments of the invention. Instead, however, of the battery being connected to the slide-wire 50 at one end thereof, as is done in the form of the invention shown in Fig. 1, the connection to the battery is in the form of a tap made at a point 58 an appreciable distance along the slide-wire from the end first to be engaged by the rotating contact arm 51. As a result of this connection, the potential derived from said contact arm and applied in opposition to the potential under measurement from the source 56, after rising to a maximum value immediately prior to the contact arm leaving the right hand terminal of the slide wire, will fall to zero as said contact arm engages the left hand end of said slide wire, and will remain at zero until the contact arm passes the tapped point 58. There is thus introduced into the operation of the system a definite time lag before the derived potential begins its uniform rise. This time interval being made of sufficient duration to allow the mechanism of the receiving instrument to reset to its zero point, assurance is had that there will be no errors introduced due to rebound or other delays in the receiving mechanism.

In Fig. 4 is shown an alternative form of device for introducing the desired delay into the cycle of operation. A slide-wire 60 traversed by a continuously rotating contact arm 61 and energized from a battery 64 through a variable rheostat 65 is connected in a manner identical to the embodiment of the invention shown in Fig. 1, for the purpose of determining the values of an E. M. F. developed at a source 66, and operating the same in impulses of varying durations developed by a galvanometer-type relay 67. Between the right and left hand terminals of the slide-wire 60 is connected an adjustable potentiometer-type rheostat 68; and the conductor corresponding to that which in Fig. 1 is connected to the left hand terminal of the slide-wire is in this case connected to the sliding contact on the rheostat 68. With this arrangement, as the rotating contact arm 61 engages the left hand terminal of the slide-wire, the potential applied in opposition to that developed at the source 66 will be of a polarity to boost instead of to oppose said developed potential, with the result that the tendency of the galvanometer-type relay will be to remain deflected in a negative sense. This condition will continue until the arm 61 passes a point on the slide-wire 60 having a potential corresponding to that of the sliding contact on the rheostat 68, at which point the opposing potential will pass through a zero value and will begin to increase at a uniform rate as in the previously considered embodiments of the invention. The time taken for the arm 61 to travel from the left hand terminal of the slide-wire 60 to the point of reversal of potential will provide the delay necessary to the functioning of the receiving instrument; and by virtue of the adjustability of the position of the sliding contact on the rheostat 68, this time interval may be varied according to requirements.

It will, of course, be understood that the above-described delay effecting arrangement of Fig. 3 or Fig. 4 may be included in either the Fig. 1 or the Fig. 2 embodiment of the invention.

The operation of the device as thus far described in its several forms may be better understood by reference to Figs. 5 and 6, wherein appear graphical representations of the potential values in various parts of the circuits and of the timed impulses derived therefrom. In Fig. 5, which indicates graphically the performance of the apparatus as shown diagrammatically in Fig. 1 of the drawings, the horizontal scale is taken as representative of time values and the vertical ordinates as proportional to voltage values. The irregular line M—N represents graphically the values attained by the potential lines to be measured during the time under consideration. The diagonal lines A—c, C—e, etc. represent the values of potential between the rotating arm and the left-hand end of the slide wire. Time is thus divided into uniform intervals A—C, C—E, etc. as measured along the horizontal scale, the durations of such intervals being determined by the rate of rotation of the arm 11 and each of said intervals representing one transit of said arm through the gradient of potential existing between the terminals of the slide-wire. It will be seen that during each of these intervals there is a period of time during which the slide-wire potential is less than the value of the electromotive force to be measured, and another period of time during which the slide-wire potential is the greater of the two. At the instant where the value of the slide-wire potential passes that of the measured E. M. F., as at b in the cycle A—C, and at d in the cycle C—E, the galvanometer or sensitive relay device in the measuring circuit as hereinbefore described will abruptly act to affect conditions in the telemetering circuit, thus defining the length of the impulses in each of the successive cycles. By projecting the point b onto the horizontal scale at B, and by projecting the point d onto the horizontal scale at D, the successive uniform cyclical intervals A—C and C—E are thus divided into periods of which A—B and C—D represent the impulses in the two successive cycles. Since the duration of the impulse in each cycle is directly determined by the relation of the interval during which the cyclically varied potential is less than, to that in which it is greater than, the impressed voltage, and since said potential is varied at a constant rate, it follows that the duration of each of said impulses is a quantitative measure of the value of said voltage at the instant in the cycle when the magnitude of the varied potential passes through that value. Since the receiving instrument 25, as hereinbefore set forth, is adapted to provide a quantitative measure based on the durations of said impulses, it follows that said instrument may be calibrated in terms of the voltage under measurement. The succession of impulses as applied to said receiving instrument thus will provide a continuous measure of these values.

In Fig. 6 is indicated the manner in which the element of time delay is introduced by the modified embodiments of the invention as shown in Figs. 3 and 4. As in Fig. 5, the horizontal scale represents time and the vertical ordinates represent potential values. The irregular line P—O represents the value of the measured potential during the time under consideration. With the arrangement shown in Fig. 3, wherein the potential between the sliding contact and the left-hand terminal of the slide-wire remains constant until the tapped point 58 is passed, this potential as shown in Fig. 6 will be represented as following the horizontal zero line from the beginning of a cycle as at G, until a point H is reached corresponding to the location of the tapped point on the slide-wire. After the contact arm passes the tapped point the slide-wire potential will rise uniformly along the line H—k to the end of the cycle, passing a point j where said potential is equal to the measured electromotive force, and then falling to a zero value to initiate a further cycle of operation. The projection J of the point j on the horizontal scale defines the time interval H—J during which the voltage was increasing before the measured value was attained; and the preceding interval G—H, during which the slide wire potential was constant, provides the delay interval essential to the operation of some forms of telemetering receivers as hereinbefore set forth.

With the form of the invention as shown in Fig. 4, the potential values as attained by the rotating contact arm with respect to the left-hand terminal of the slide-wire will be represented by the line g—H—k, the dotted portion g—H of said line indicating the negative values attained while the contact arm is traversing that portion of the slide-wire which corresponds to the tapped portion of the shunt resistor 68. Since the galvanometer or equivalent sensitive relay in the measuring circuit responds only upon a reversal in polarity of the applied voltage, it is of no consequence whether the potential during the time interval G—H of negative value or of zero value, so long as it is less than the value of the measured E. M. F. Thus, the performance of the form of the invention shown in Fig. 3 will be identical to that of the form shown in Fig. 4.

In Fig. 7 is shown an alternative form of the invention, utilizing a vacuum tube as a relay, and thereby enabling use to be made of an especially sensitive galvanometer. A slide-wire 70 traversed by a continuously rotating contact arm 71 and energized from a battery 74 through a variable rheostat 75, is connected in the manner identical to the embodiment of the invention shown in Fig. 4, for the purpose of determining the values of E. M. F. developed at a source 76, and expressing the same in impulses of varying durations developed by a sensitive contact-making galvanometer 77. Between the right and left-hand terminals of the slide-wire 70 is connected an adjustable potentiometer-type rheostat 78; and, as in Fig. 4 a conductor passes from the sliding contact on the rheostat 78 to one terminal of the actuating winding of the galvanometer 77. Connected in series between the source 76 and the galvanometer 77 is a resistance 80. A three-electrode vacuum tube 81 is provided with a plate 82, a grid 83 and a cathode 84 adapted to be heated by a filament 85 energized from a suitable source 86. The terminal of the galvanometer winding to which the resistance 80 is attached is also connected by a conductor 87 to the cathode 84 of the vacuum tube 81, and is further connected by means of a flexible lead to one of the contacts of said galvanometer. The other of said contacts is connected to a stationary contact 88 positioned adjacent to the left-hand terminal of the slide-wire 70 and adapted to be electrically engaged by an arm 71 at the same moment as said arm engages said left-hand contact, said last-named galvanometer contact is also connected to one terminal of a battery 89 in series therewith to the grid of the vacuum tube 81. The plate of the vacuum tube is connected in series with a suitable battery 90 to one terminal of the winding of a relay 91, having contacts adapted to control electrical impulses, the other terminal of said relay winding being connected to the same terminal of the source 76 as is connected to the resistance 80.

The magnitudes and polarities of battery voltages are made such that the battery 89 applies a negative bias to the grid of the tube 81 when the galvanometer contacts are closed, this bias being made sufficient to reduce the plate current to zero. When the galvanometer contacts are open the bias is removed, and the tube becomes conducting. When the circuit through the relay 91 is complete and the tube 81 is conducting, the current in said cicuit will pass through the resistance 80 and develop a potential across its terminals. The value of the resistance is made such that said potential when applied to the circuit including the source 76 will pass through said circuit sufficient current to deflect the galvanometer 77 in a sense to open the circuit controlled by its contacts.

The sequence of events during a normal cycle of operation is as follows: It may first be assumed that the arm 71 in its clockwise rotation about the slide-wire 70 is in the zone between the left-hand terminal of said slide-wire and the point at which the slide-wire potential will be equal to that derived from the source 76. Under this condition the contacts of the galvanometer 77 will be closed, so that the grid bias on the tube 81 will be such as to reduce the plate current, and therefore the current in the relay 91, to a zero value. As the contact arm 71 passes the null point, at which the slide-wire potential exactly balances the measured E. M. F., the current through the galvanometer will be reversed and the galvanometer contacts will tend to separate. This will result in an immediate removal of the grid bias, whereupon the tube 81 will become conducting and current will flow through the relay 91, actuating its contacts in a sense to establish one end of an electrical impulse suited to telemetering as hereinbefore set forth. The potential drop due to the flow of said current through the resistance 80 adds to the potential in the galvanometer circuit a relatively large E. M. F. of such polarity as to supplement the force tending to separate the galvanometer contacts. This action effectually prevents chattering of said contacts, and renders operation of the galvanometer positive as the arm 71 passes the null point on the slide-wire.

Current flow once having been established through the plate circuit of the tube 81, the tube will remain conducting so long as no negative bias is applied to the grid 83. This condition continues until the rotating arm 71 in its normal cycle of operation simultaneously engages the contact 88 and the left-hand terminal of the slide-wire 70. Engagement of the arm 71 with said slide-wire terminal, as hereinbefore pointed out, effects an abrupt transition of the "sawtooth voltage" from one to the other of its extreme values, and determines one end of a cycle of operation. At the same time, engagement of the arm 71 with the contact 88 provides a momentary connection between said contact and the left-hand terminal of the slide-wire 70, whereby a negative grid bias is again applied to the tube 81, rendering the same non-conducting, and terminating the flow of current in the relay 91. In this manner an impulse is established and interrupted in the telemetering circuit; and the duration of this impulse is made directly dependent upon the position on the slide-wire 70 at which the rotating arm 71 finds the slide-wire potential to be exactly equal to that derived from the source 76. Thus, as the rotation of the arm 71 continues without interruption, there are established by the contacts of the relay 91 cyclical impulses of durations representative in value of the magnitude of the potential appearing at the terminals of the source 76.

The potentiometer-type resistor 78, bridged across the terminals of the slide-wire 70, and being connected in the galvanometer circuit by means of an adjustable slider, provides means for introducing into the successive impulses a definite time lag desirable to the functioning of certain forms of receiving instrument. This element of the apparatus functions in a manner identical with that set forth in the form of the invention illustrated in Fig. 4. The interposition of the vacuum tube 81 and its associated circuits in the network, as shown in Fig. 7 materially lessens the work required of the galvanometer member, in that it is necessary only for the galvanometer contacts to move through the small angle sufficient to interrupt the grid bias, the current required for this purpose being of negligible magnitude. Because of the lighter duty required of the galvanometer contacts, it is possible to utilize an instrument having a relatively high degree of sensitivity, with a correspondingly delicate response to current reversal as the revolving arm 71 passes the null point on the slide-wire 70.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In telemetric apparatus, a device for producing successive electrical impulses of durations corresponding to successively attained magnitudes of an electromotive force between two terminals, and comprising an extended potentiometer slide-wire and means for maintaining a constant electrical potential between selected points thereon, a contact continuously and repeatedly scanning said slide-wire whereby the potential between said contact and either of said points is smoothly varied between a first and a second value and returned from said second to said first value, a connection between a point on said slide-wire and one of said terminals, a connection between said contact and the other of said terminals, means in circuit with said connections for producing in each of a series of scanning movements of said contact a continuous signal of a time duration corresponding with the magnitude of said E. M. F. between said terminals, and receiving means responsive to said signals.

2. A device for producing successive electrical impulses of durations corresponding to successively attained magnitudes of an electromotive force between two terminals, and comprising an extended potentiometer slide-wire and means for maintaining a constant electrical potential between selected points thereon, a contact continuously and repeatedly scanning said slide-wire whereby the potential between said contact and either of said points is subjected to a smooth variation from a first to a second value and returned from said second to said first value, means for introducing a predetermined time delay between said return and the succeeding smooth variation, and including a connection between a point on said slide-wire and one of said terminals, a connection between said contact and the other of said terminals, and circuit-controlling means in circuit with said connections, and adapted to control a second circuit in one sense when said controlling means is subjected to an E. M. F. of one polarity and to control said circuit in an opposite sense when said controlling means is subjected to E. M. F. of an opposite polarity.

3. A device for producing successive electrical impulses of durations corresponding to successively attained magnitudes of an electromotive force between two terminals, and comprising an extended potentiometer slide-wire and means for maintaining a constant electrical potential between selected points thereon, a contact continuously and repeatedly scanning said slide-wire, whereby the potential between said contact and either of said points is subjected to a smooth variation from a first to a second value and returned from said second to said first value, means for introducing a predetermined time delay between said return and the succeeding smooth variation and including a connection maintaining one of said terminals at the same potential as a selected point on said slide wire, a connection between said contact and the other of said terminals, and circuit-controlling means in circuit with said connections, and adapted to control a second circuit in one sense when said controlling means is subjected to an E. M. F. of one polarity and to control said circuit in an opposite sense when said controlling means is subjected to E. M. F. of an opposite polarity.

4. A device for producing successive electrical impulses of durations corresponding to successively attained magnitudes of an electromotive force between two terminals, and comprising an extended potentiometer slide-wire and means for maintaining a constant electrical potential between selected points thereon, a contact continuously and repeatedly scanning said slide-wire whereby the potential between said contact and either of said points is smoothly varied between a first and a second value and returned from said second to said first value, a portion of said slide-wire of appreciable length adjacent one end thereof being maintained at a single potential throughout its length, a connection between a point on said slide-wire and one of said terminals, a connection between said contact and the other of said terminals, and circuit-controlling means in circuit with said connections and adapted to control a second circuit in one sense when said controlling means is subjected to an E. M. F. of one polarity and to control said second circuit in an opposite sense when said controlling means is subjected to an E. M. F. of an opposite polarity.

5. A device for producing successive electrical impulses of durations corresponding to successively attained magnitudes of an electromotive force between two terminals, and comprising an extended potentiometer slide-wire and means for maintaining a constant electrical potential between selected points thereof, a contact continuously and repeatedly scanning said slide-wire, whereby the potential between said contact and either of said points is smoothly varied between a first and a second value and returned from said second to said first value, means for preventing said contact from reaching a potential exceeding zero with respect to one end of said slide-wire until after the lapse of a predetermined time interval following the transition from said maximum potential, a connection between a point on said slide-wire and one of said terminals, a connection between said contact and the other of said terminals, and circuit-controlling means in circuit with said connections, and adapted to control a second circuit in one sense when said controlling means is subjected to an E. M. F. of one polarity and to control said second circuit in an opposite sense when said controlling means is subjected to E. M. F. of an opposite polarity.

6. In telemetering systems for transmitting measurements representative of values attained by an electromotive force, a receiving instrument adapted to provide a measure governed by the relative durations of successive cyclical impulses, a telemetering circuit for the same, a transmitting instrument including means for producing a "saw-tooth" voltage of predetermined limiting values between which lies the value of the electromotive force to be measured, means for opposing said saw-tooth voltage by said electromotive force to be measured, and means comprising a polarity-sensitive circuit-controlling device adapted to affect said telemetering circuit in one sense when said measured electromotive force exceeds the portion of said saw-tooth voltage to which it is opposed, and to affect said circuit in an opposite sense when said measured electromotive force is less than the portion of the saw-tooth voltage to which it is opposed, for producing in said telemetering circuit successive cyclical impulses of durations commensurate with values of said electromotive force adapted to affect said receiving instrument to provide a measure of said electromotive force.

7. In telemetric apparatus, a device for producing successive electrical impulses of durations corresponding to successively attained magnitudes of an electromotive force between two terminals, and comprising an extended potentiometer slide-wire and means for maintaining a constant electrical potential between selected points thereon, a contact continuously and repeatedly scanning said slide-wire whereby the potential between said contact and either of said points is smoothly varied between a first and a second value and returned from said second to said first value, a connection between a point on said slide-wire and one of said terminals, a connection between said contact and the other of said terminals, and means in circuit with said connections for producing in each of a series of scanning movements of said contact a continuous signal of a time duration corresponding with the magnitude of said E. M. F. between said terminals.

8. Telemetric transmitting apparatus comprising means for producing a "saw-tooth" voltage of predetermined limiting values between which lies the value of the electromotive force to be measured, means for opposing said saw-tooth voltage by said electromotive force to be measured, and means comprising a polarity-sensitive circuit-controlling device adapted to affect said telemetering circuit in one sense when said measured electromotive force exceeds the portion of said saw-tooth voltage to which it is opposed, and to affect said circuit in an opposite sense when said measured electromotive force is less than the portion of the saw-tooth voltage to which it is opposed, for producing successive cyclical impulses of durations commensurate with values of said electromotive force.

JAY N. SWARR.